United States Patent
Couturier et al.

(10) Patent No.: US 9,518,764 B2
(45) Date of Patent: Dec. 13, 2016

(54) LONGER-LIFE SOLAR POWER PLANT RECEIVER

(75) Inventors: Raphael Couturier, Sassenage (FR); Gatien Fleury, Greoux-les-Bains (FR); Etienne Bregeard, Canohes (FR); Arnaud Bruch, Saint Colombe (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 515 days.

(21) Appl. No.: 14/122,945

(22) PCT Filed: May 30, 2012

(86) PCT No.: PCT/EP2012/060134
§ 371 (c)(1),
(2), (4) Date: Nov. 27, 2013

(87) PCT Pub. No.: WO2012/163962
PCT Pub. Date: Dec. 6, 2012

(65) Prior Publication Data
US 2014/0109893 A1    Apr. 24, 2014

(30) Foreign Application Priority Data
May 31, 2011    (FR) .................................. 11 54769

(51) Int. Cl.
*F24J 2/10*    (2006.01)
*F24J 2/51*    (2006.01)
(Continued)

(52) U.S. Cl.
CPC .. *F24J 2/51* (2013.01); *F24J 2/07* (2013.01); *F24J 2/10* (2013.01); *F24J 2/16* (2013.01);
(Continued)

(58) Field of Classification Search
CPC .................... F24J 2/07; F24J 2/16; F24J 2/46; F24J 2/51
(Continued)

(56) References Cited

U.S. PATENT DOCUMENTS 4,069,812 A * 1/1978 O'Neill ...................... F24J 2/07
126/600
4,088,120 A * 5/1978 Anderson .................. F24J 2/07
126/573
(Continued)

FOREIGN PATENT DOCUMENTS

FR    2 458 032    12/1980
FR    2998355 A1 * 5/2014 ................. F24J 2/04

OTHER PUBLICATIONS

International Search Report issued Oct. 5, 2012, in PCT/EP12/060134 filed May 30, 2012.
(Continued)

*Primary Examiner* — Gregory Huson
*Assistant Examiner* — Nikhil Mashruwala
(74) *Attorney, Agent, or Firm* — Oblon, McClelland, Maier & Neustadt, L.L.P.

(57) ABSTRACT

A solar receiver with a longitudinal axis, including an absorber, a beam extending over an entire length of the solar receiver and configured to suspend the receiver in the power plant, a protective envelope mounted around the beam and including a thermal insulator surrounding the beam, the protective envelope configured to protect the beam from heating due to solar flux, the beam and the protective envelope configured to slide one with respect to the other along the longitudinal axis.

18 Claims, 5 Drawing Sheets

(51) Int. Cl.
*F24J 2/07* (2006.01)
*F24J 2/16* (2006.01)
*F24J 2/46* (2006.01)

(52) U.S. Cl.
CPC ........... *F24J 2/4621* (2013.01); *F24J 2/4636* (2013.01); *F24J 2/4641* (2013.01); *F24J 2002/108* (2013.01); *Y02E 10/41* (2013.01)

(58) Field of Classification Search
USPC .................. 126/634, 684, 704, 600, 450
See application file for complete search history.

(56) References Cited

U.S. PATENT DOCUMENTS

| | | | |
|---|---|---|---|
| 4,343,298 A | 8/1982 | Ambille et al. | |
| 4,505,260 A * | 3/1985 | Metzger | F24J 2/06 126/637 |
| 5,465,708 A * | 11/1995 | Goebel | F03G 6/06 126/635 |
| 2007/0157923 A1 * | 7/2007 | Le Lievre | F24J 2/07 126/692 |
| 2009/0056699 A1 | 3/2009 | Mills et al. | |
| 2009/0056701 A1 | 3/2009 | Mills et al. | |
| 2009/0056703 A1 | 3/2009 | Mills et al. | |
| 2011/0005513 A1 | 1/2011 | Mills et al. | |
| 2011/0193512 A1 * | 8/2011 | Singhal | F03D 9/007 320/101 |
| 2013/0074830 A1 * | 3/2013 | Mulcey | F24J 2/14 126/657 |
| 2013/0118479 A1 | 5/2013 | Fourmigue et al. | |
| 2013/0125873 A1 | 5/2013 | Pra et al. | |
| 2013/0152917 A1 | 6/2013 | Couturier et al. | |
| 2013/0244136 A1 | 9/2013 | Fleury et al. | |
| 2014/0000581 A1 | 1/2014 | Couturier et al. | |

OTHER PUBLICATIONS

French Preliminary Search Report issued Feb. 22, 2012 in Patent Application No. FR 1154769 (with English translation of Categories of Cited Documents).

* cited by examiner

LONGER-LIFE SOLAR POWER PLANT RECEIVER

TECHNICAL FIELD AND PRIOR ART

The present relates to a solar receiver for a longer-life solar power plant receiver and a solar power plant with concentration of the Fresnel type comprising at least one such receiver.

Thermal solar technology with concentration consists of using solar radiation for heating a heat-transfer fluid serving as a hot source in a thermodynamic cycle. The concentration makes it possible to achieve more or less high temperatures and thus to benefit from more or less sizeable thermodynamic conversion yields. The technologies developed are distinguished by their means of concentrating solar rays used, by the means for transporting the heat, and optionally for storing the heat that are used, i.e. the heat-transfer fluid used and the thermodynamic conversion means that are for example steam turbines, gas turbines or Stirling engines.

There exist typically four families of concentrating solar power (CSP) systems:
- cylindro-parabolic collectors with linear focus,
- linear Fresnel concentrators,
- systems with a central receiving tower, and
- parabolas with moving focus.

Each concentrating solar power system comprises a solar receiver the function of which is to transfer the heat from the solar radiation to a fluid, such as water, oil or a gas. This solar receiver therefore forms a heat exchanger. This exchanger is formed by one or more tubes placed in parallel, in which the heat-transfer fluid circulates.

In the particular case of a concentrating solar power plant of the Fresnel type, the solar receiver receives the light rays reflected by mirrors and transmits them to the heat-transfer fluid in the form of heat.

A solar receiver typically comprises:
- an absorber that receives the solar flux on its bottom face and in which the heat-transfer fluid circulates, for example oil or steam, the absorber may be formed for example from one or more juxtaposed tubes in which a heat-transfer substance circulates,
- optionally a layer of a thermally insulating material for limiting the heat losses from the absorber to the outside,
- optionally a glazed panel for isolating the absorber from the external environment and delimiting a closed cavity between the absorber and the glazing.

The solar receiver is suspended by a metal structure above mirrors.

The solar flux reflected by the mirrors may not be correctly oriented and/or focused with respect to the absorber and the solar spot concentrated may then illuminate part of the metal structure, instead of illuminating only the absorber. This focusing defect may cause a differential expansion within the structure that may give rise to mechanical stresses for example in bending or torsion, stress concentrations and a reduction in the characteristics of the materials at the hot parts. Indeed it has been estimated that a rise in temperature of approximately 300° C. could occur on the bearing structure, which causes an expansion of 5 mm/m in the case of a steel structure. This deformation by expansion is therefore prejudicial to the integrity of the assembly, all the more so when the expansion is not symmetrical.

The document US 2009/0056703 describes a solar power plant of the Fresnel type comprising a receiver formed by an absorber and a rigid bearing structure. In the event of a defect in focusing the reflected solar flux, the bearing structure is exposed to the concentrated solar flux and is liable to deform and be damaged. Furthermore, the heating of the absorber also heats the bearing structure.

DISCLOSURE OF THE INVENTION

Consequently one aim of the present invention is to offer a solar receiver offering good mechanical resistance to heating.

The aim previously stated is achieved by a solar receiver comprising an absorber, a bearing structure intended to allow the receiver to suspend above mirrors and a structure for protecting the bearing structure from the solar flux and for supporting the absorber. The bearing structure is mechanically independent in a longitudinal direction of the protection structure. Furthermore, the bearing structure is barely subjected to the heating due to the solar flux. Thus the bearing structure barely expands and the differential expansion between the bearing structure and the protection structure is not liable to damage the receiver.

In other words, the functions of supporting the receiver and supporting the absorber are mechanically dissociated and the means forming a support are protected from detrimental heating, which avoids excessive deformation thereof by thermal expansion.

Advantageously, the absorber and the protection structure are mechanically independent in a longitudinal direction of the protection structure.

Preferentially, thermal insulation is disposed in the protection structure between the beam and the absorber.

Advantageously, the receiver comprises radiative screens on either side of the absorber on the protection structure, making the receiver not very sensitive to the focusing defects of the concentrated solar flux.

The subject matter of the present invention is then a solar receiver with a longitudinal axis comprising an absorber, a bearing structure extending over the entire length of the solar receiver and intended to suspend the receiver in the power plant, and a protection structure mounted around the bearing structure forming an envelope around the bearing structure, said protection structure being able to protect the bearing structure from the heating due to the solar flux, the bearing structure and the protection structure being able to slide with respect to each other along the longitudinal axis, the absorber extending longitudinally.

Advantageously, the protection structure and the absorber are able to slide with respect to each other along the longitudinal direction.

For example, the bearing structure comprises a beam or several beam elements fixed to one another.

The thermal protection structure can comprise an external shell and an internal shell delimiting a space for the bearing structure, thermal insulation being disposed in said space around the bearing structure so as to thermally insulate the bearing structure.

In a preferential manner, a thermal insulation is disposed between the internal shell and the bearing structure. For example, it is rockwool or glass wool.

Advantageously, the receiver may comprise stiffening ribs fixed in the external shell, said ribs resting on the bearing structure. The internal shell may then be secured to the ribs.

Advantageously, the bearing structure comprises a cladding offering a reduced coefficient of friction with respect to the ribs, for example made from boron nitride.

In an example embodiment, the internal shell delimits a housing receiving the absorber, said absorber resting on transverse axes, each transverse axis being fixed to two lateral uprights of a rib, the absorber thus being free to slide along the longitudinal axis with respect to the thermal protection structure.

The internal shell may be formed from modules with a length less than that of the external shell, the modules overlapping at their longitudinal ends.

For example, the thermal insulation material is formed from solid blocks mounted between the ribs, for example made from rockwool or glass wool.

Advantageously, the solar receiver comprises radiative screens secured to the internal shell and covering the lateral edges of the thermal protection structure. The radiative screens are for example in a single piece with the internal shell.

In an example embodiment, the radiative screens have their two surfaces free for cooling by convection. The radiative screen may comprise a plurality of through holes.

The solar receiver may comprise a protective glazing upstream of the absorber in the direction of the reflected solar flux. The protective glazing is advantageously in abutment against the internal shell and is held on the thermal protection structure by deformation of the internal shell.

The internal shell is advantageously secured to the ribs by deformation of the latter.

Another subject matter of the present invention is a solar power plant of the Fresnel type comprising:
  a receiver according to the invention,
  a frame from which said receiver is suspended above mirrors,
  suspension means, such as cables, connecting the bearing structure of the frame,
  a circuit supplying "cold" heat transfer substance connected to an inlet of the absorber, and
  a circuit for collecting "hot" heat transfer substance connected to an outlet of the absorber.

BRIEF DESCRIPTION OF THE DRAWINGS

The present invention will be understood better by means of the following description and the accompanying drawings, in which.

DETAILED DISCLOSURE OF PARTICULAR EMBODIMENTS

Figure 4:
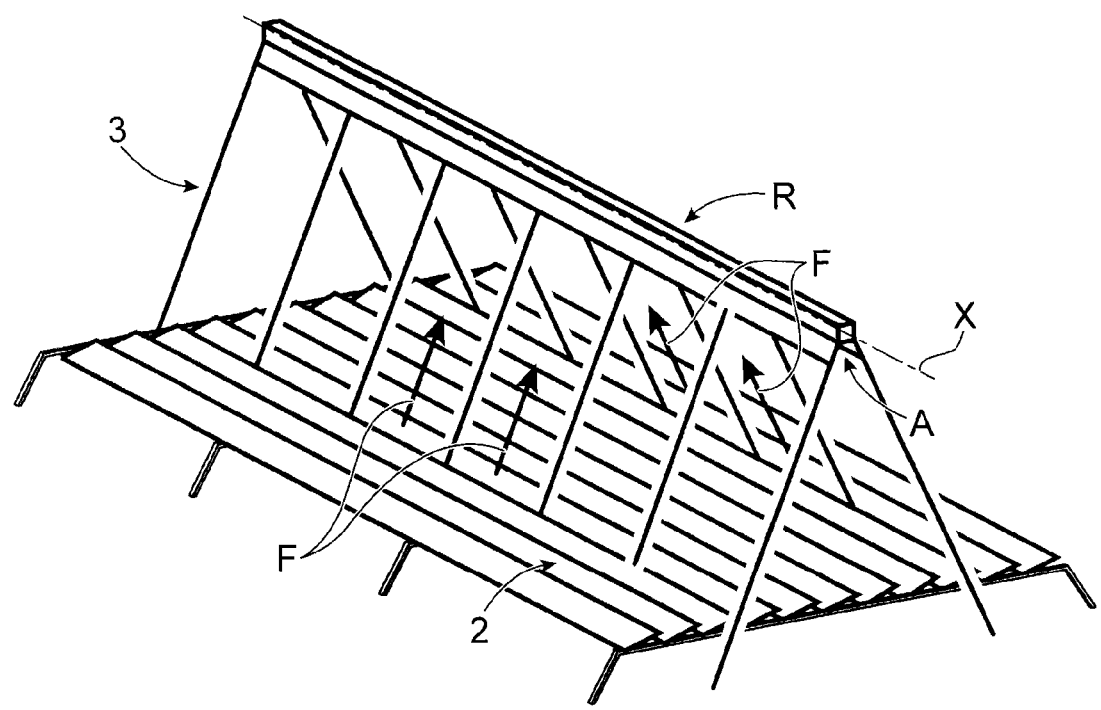
FIG. 4 is a view in schematic perspective of an example of a solar power plant in which a receiver according to the present invention can be used.

In FIG. 4, an example embodiment of a solar power plant of the Fresnel type can be seen.

The solar power plant comprises a receiver R, mirrors 2 for reflecting the solar rays to an absorber A disposed in the receiver R, a system (not shown) for supplying the receiver with "cold" heat transfer substance, a system (not shown) for collecting the "hot" heat transfer substance at the discharge from the receiver and thermodynamic conversion means (not shown) that include for example steam turbines, gas turbines, etc. The power plant and the solar receiver extend along a longitudinal axis X.

The solar receiver R is suspended above the mirrors 2. These reflect and concentrate the solar radiation in the direction of the solar receiver R, more specifically in the direction of an absorber A. The mirrors 2 may be orientable with respect to the ground so as to be able to orient the solar flux F in the direction of the receiver.

The receiver R may comprise a plurality of elements connected to one another along the longitudinal axis X. For example, these are receiving elements measuring 5 meters in length.

The receiver R is suspended above the mirrors by means of a means 3, in the example shown this is a frame 3, with a height of between for example 7 m and 15 m.

Figure 1:
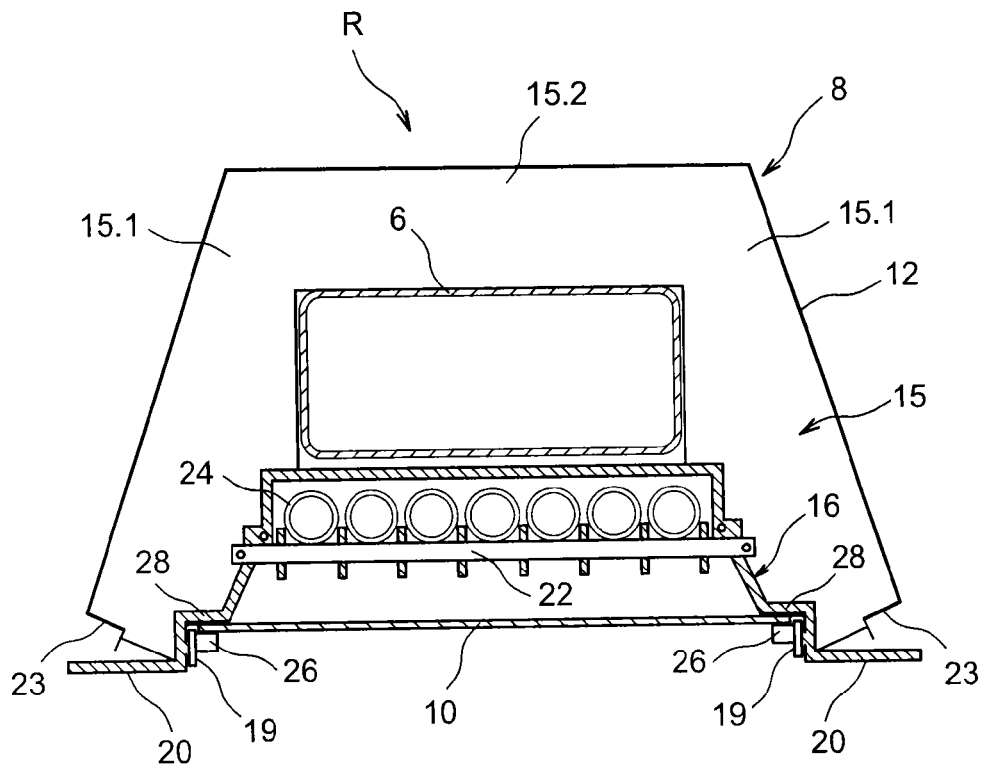
FIG. 1 is a view in transverse section of an example embodiment of a receiver according to the present invention.

In FIG. 1, a view in transverse section of a solar receiver R according to the present invention can be seen.

The receiver R comprises a bearing structure intended to enable the receiver R to be suspended from the frame 3, which may be rigid or formed by suspension cables. The bearing structure is formed by a beam 6 extending along the axis X. Means (not shown) for suspending the beam 6 from the frame are provided. Said means may leave free the movement of the beam with respect to the frame.

The receiver also comprises the absorber A and a protection structure 8 that protects the bearing structure against the solar flux.

In the example shown the receiver R comprises glazing 10 interposed between the absorber A and the mirrors 2 and protecting these from the external elements.

The various elements of the receiver will now be described in detail.

The protective structure 8 comprises an external shell 12 intended to rest on the beam and an internal shell 16 intended to rest under the beam 6.

The external shell 12 comprises a bottom 12.1 and two lateral walls 12.2 delimiting a channel of longitudinal axis X. In the example shown, the lateral walls 12.2 are inclined, defining a splayed channel.

The external shell 12 is for example made from stainless steel or steel treated against corrosion, for example by galvanising. This is because, since the external shell 12 is subject to bad weather, it is preferable for it be protected against corrosion. The external shell 12 has for example a thickness of 1 to 5 mm, preferably between 2 and 3 mm.

Ribs 15 secured to the bottom 12.1 and to the lateral walls 12.2 in order to stiffen the external shell 12 are provided inside the external shell 12. The ribs 15 are preferably distributed regularly along the axis X. The ribs 15 are for example welded to the bottom 12.1 and the lateral walls 12.2. They may also be fixed by riveting or snapping onto the external shell 12. The ribs 15 are disposed in planes orthogonal to the axis X.

The ribs can be produced from stainless steel, galvanised steel, etc. Preferably they are produced from the same material as the external shell.

In a variant, it could be envisaged that the ribs be made directly in one piece with the external shell, for example by stamping.

The ribs 15 comprises two lateral uprights 15.1 connected by a cross member 15.2, forming a U. The external profile of the ribs 15 corresponds to the internal profile of the external shell 12. In the example shown, the external edges of the lateral uprights 15.1 are inclined.

The internal profile of the ribs 15 is such that it corresponds to the external profile of the beam 6. In the example shown, the beam 6 has a rectangular cross section, the internal profile of the ribs 15 is also rectangular. The dimensions of the internal profile of the ribs 15 are such that a free sliding between the beam 6 and the ribs 15 is possible so as to ensure a degree of freedom in translation along the axis X between the beam 6 and the protective structure. The set of ribs 15 therefore defines a longitudinal housing for the beam 6.

Figure 3A:
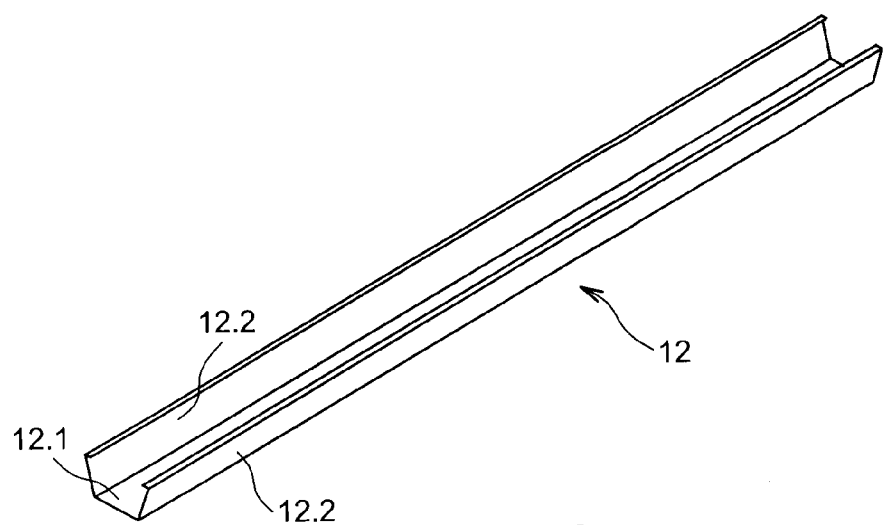
FIGS. 3A, 3B, 3B', 3C and 3D are representations in perspective of various steps of manufacturing the receiver of FIG. 1.
Figure 3B:
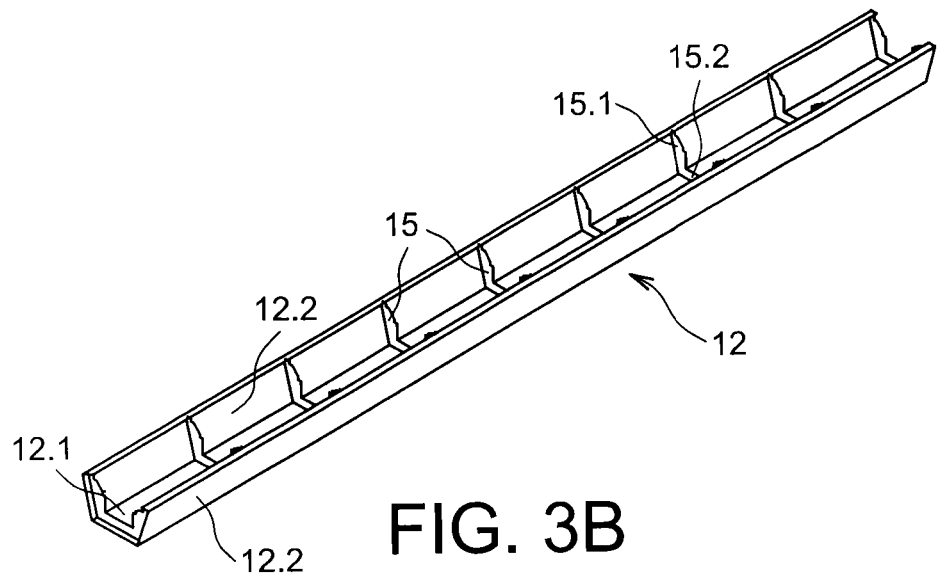
Figure 3B:
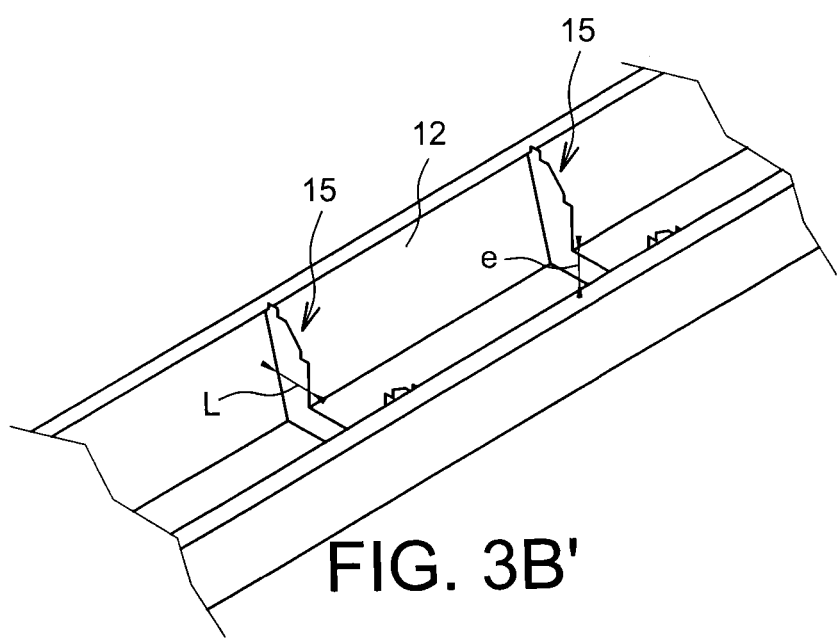

As can be seen in FIG. 3B', the internal edges of the lateral uprights 15.1 also advantageously comprise cutouts for forming abutments and/or fixing areas for the various elements mounted in the external shell 12.

The protective structure also comprises a thermal insulation material 17 disposed in the external shell 12 between the ribs 15. In the example shown, this material 17 is formed by independent modules mounted between each pair of ribs 15 and filling the space between two ribs 15.

For example, the thermal insulation may be in the form of layers of ceramic fibre, for example glass wool or rockwool or any other material suited to the temperature range concerned.

In a variant, it may be in the form of a brick with a shape corresponding to the internal shape of the channel, the bricks being manufactured by moulding or machining.

The thickness of the thermal insulation 17 is less than the thickness e of the bottom 15.1 of the rib 15 and the width L of its lateral edges 15.2 (visible in FIG. 3B') so that the beam 6 and the bottoms 15.1 of the ribs 15 are in contact.

During the functioning of the receiver, a relative sliding between the beam 6 and the ribs 15 appears. Preferably, the beam 6 receives a treatment on its face in contact with the bottom of the ribs 15 limiting friction, for example a layer of boron nitride; the latter may be applied like a paint.

The internal shell 16 of the protective structure is mounted inside the external shell 12 and delimits with the external shell 12 a cavity in which the beam 6 and the thermal insulation 17 are contained.

The internal shell 16 has a shape similar to that of the external shell 12 and delimits a housing for the absorber A intended to face the mirrors 2.

The internal shell 16 comes into abutment against cutouts made in the ribs 15. The position of the internal shell 16 with respect to the beam 6 is such that a clearance is formed between the internal shell 16 and the beam 6, limiting thermal transfers. For example, the space E thus delimited is filled with air or preferably a solid thermal insulation material such as glass wool or rockwool.

This layer of thermal insulation has for example a thickness of a few mm, for example around 2 mm.

Figure 2B:
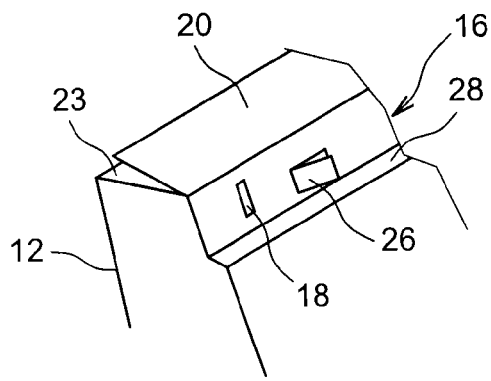
FIG. 2B is an enlarged view of a detail of FIG. 2A.

The internal shell 16 is advantageously fixed to the ribs 15, as can be seen in FIG. 2B, which is an enlarged view of a detail of FIG. 2. The internal shell 16 comprises apertures 18 (FIG. 2B) for the passage of catches 19 (FIG. 1) projecting from the lateral uprights 15.2 of the ribs 15. The catches 19 are then pivoted so as to form means of holding the internal shell 16. These holding means are simple in design and of low cost price.

Other holding means can be envisaged, for example by riveting.

The internal shell 16 is preferably made from alloy withstanding 300° C., for example stainless steel. The thickness of the internal shell 16 is for example between 0.2 mm and 1 mm. FIG. 1 is not to scale.

Highly advantageously, radiative screens 20 cover the lateral edges 23 of the receiver intended to be on the mirror side. These screens 20 are advantageously produced in a single piece with the internal shell 16 on either side of the channel that it defines, by bending the lateral edges of the metal sheet forming the internal shell 16. In a variant, they may be produced separately and fixed to the structure, for example to the external shell 12, by welding or riveting. Advantageously, the radiative screens 20 are mounted so that the air circulates along the two faces, improving their cooling by convection. Provision can be made for piercing the screens 20 with through holes in order to further improve the cooling by convection. For example, the holes may have a diameter of 1 mm every 10 mm.

Preferably, the internal shell 16 is formed by several modules that are short compared with the length of the external shell 12, and are mounted with respect to one another so that their longitudinal ends overlap, allowing a relative movement between the modules without stresses while keeping closed the space between the external shell 12 and the internal shell 16. This is because the internal shell 12 is close to the absorber and will therefore heat up and expand accordingly.

The absorber A is mounted in the internal shell advantageously free in longitudinal translation with respect to the protective structure.

In the example shown, transverse axes 22 are fixed by their longitudinal ends to the ribs 15 as can be seen in FIG. 1. Each transverse spindle is fixed to a rib 15, all the spindles forming a support for the absorber. A transverse axe 22 is not necessarily fixed to all the ribs.

In the example shown, the absorber is formed by a plurality of tubes 24 disposed longitudinally alongside one another.

Advantageously, the axes 22 comprise radial projections 21, for example in the form of washers, forming two by two by two housings for each tube.

In a variant, the absorber A could comprise a single housing delimiting one or more longitudinal channels.

The glazing 10 is mounted inside the internal shell 16 upstream of the absorber A with respect to the direction of reflected solar flux.

Advantageously, the glazing 10 is held in the internal shell 16 by lugs 26 cut directly in the internal shell 16; the lugs 26 are then folded to project towards the outside of the internal shell 16 and form a support for the glazing 10. Advantageously, the internal shell 16 comprises two lateral edges 28 forming support surfaces for the glazing 10. The glazing is then disposed between the lateral edges 28 and the lugs 26.

These fixing means are very simple and very robust and avoid the addition of any additional part. However, other fixing means can be envisaged, for example attached to the internal shell by screwing or the like.

In the example shown, the beam 6 has a rectangular cross section. In a variant, it may have a circular or square cross section or one in the form of an I-shaped or T-shaped beam or any other cross section able to provide stiffness under bending, the supporting of the protective structure and absorber assembly, and the guidance of the external shell. The beam is for example made from steel, for example a carbon steel.

Advantageously, the beam comprises an anticorrosion treatment, for example galvanising.

The manufacture of the receiver of FIG. 1 will now be described.

During a first step, the external shell 12 is manufactured for example by bending a rectangular metal sheet, as can be seen in FIG. 3A.

During a following step, the ribs 15 are fixed to the inside of the external shell 12, for example by welding over the entire length thereof, as can be seen in FIG. 3B.

Figure 3C:
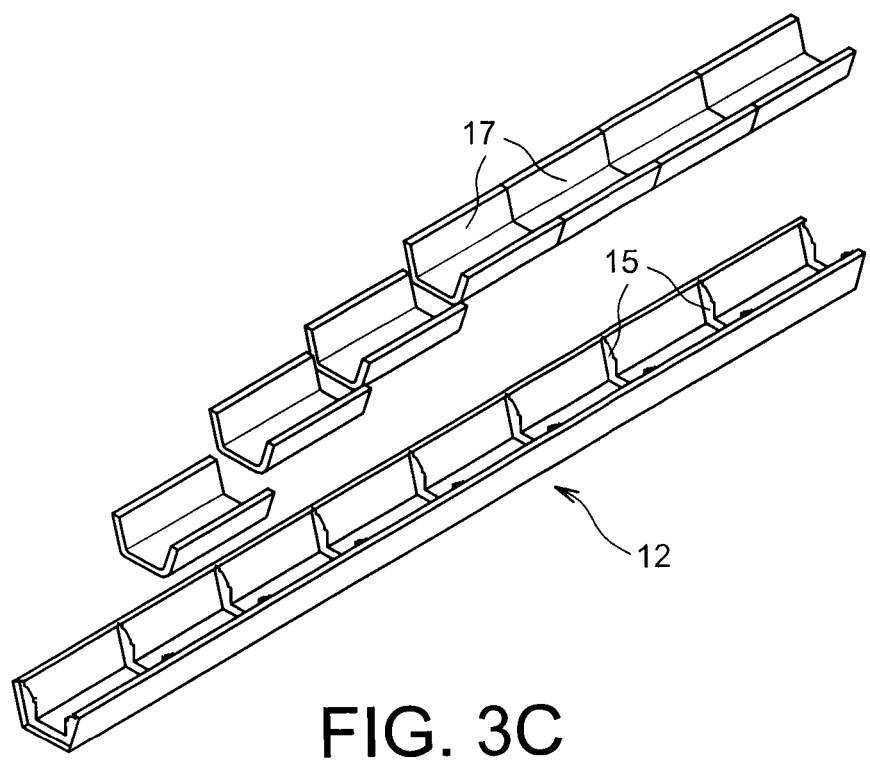

The thermal insulation 17 is then disposed between the ribs 15, as can be seen in FIG. 3C.

Figure 3D:
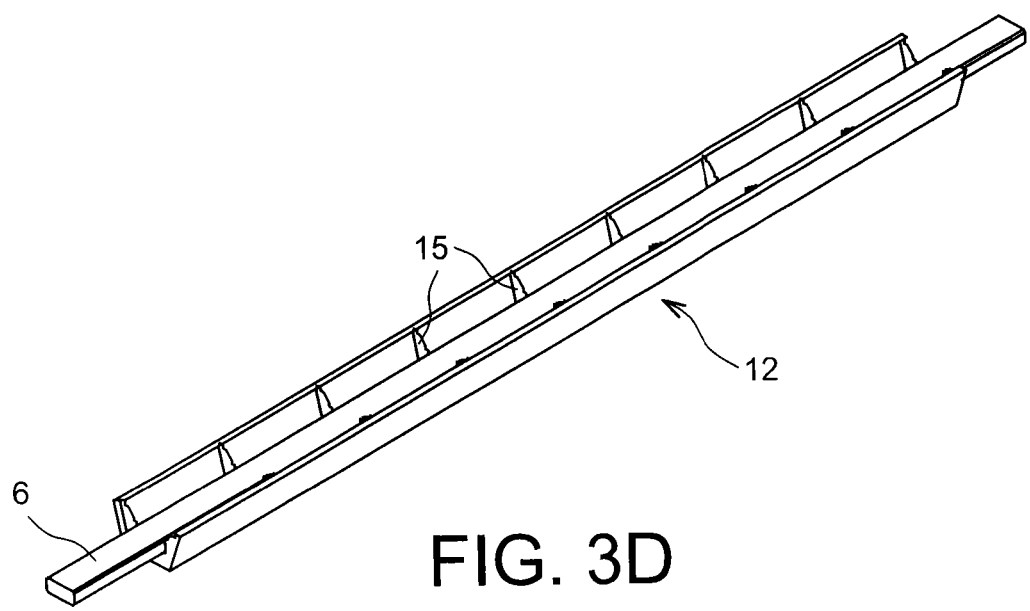

The beam 6, optionally coated with a treatment limiting friction, is then disposed in the ribs 15 so as to rest on the bottom thereof, as shown in FIG. 3D.

Advantageously, a thermal insulation layer is disposed on the beam before fitting the internal shell 16.

Figure 2A:
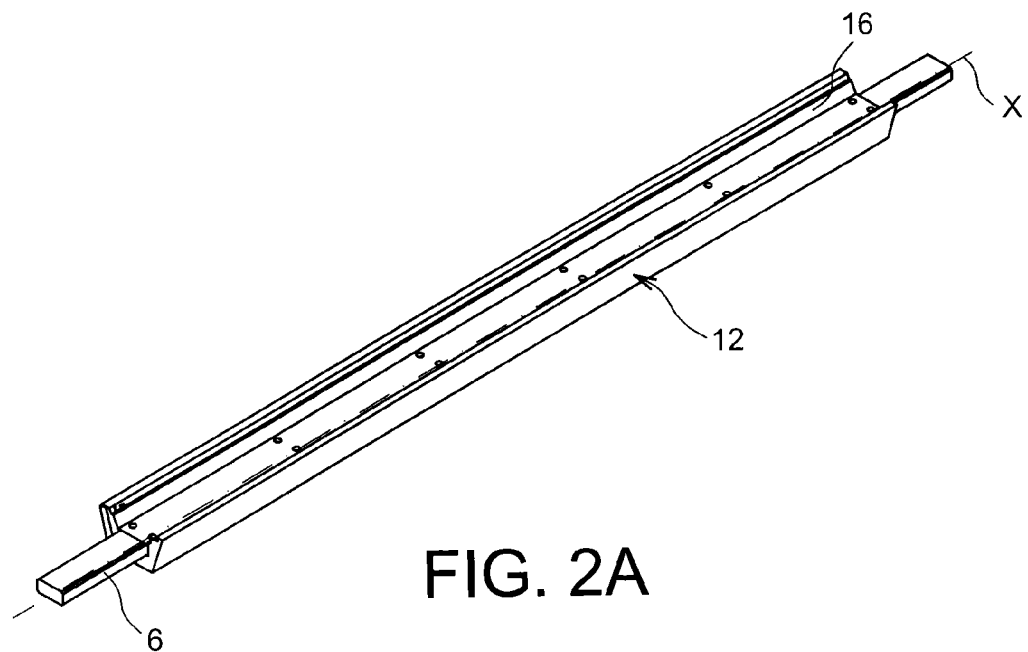
FIG. 2A is a representation in perspective of the receiver of FIG. 1, the absorber having been removed.

The internal shell 16 is then fitted on the beam 6 and is secured to the ribs 15, as can be seen in FIG. 2A.

In the case where the radiative screens 20 are separate from the internal shell 16, they are then mounted for example on the internal shell.

The absorber A is disposed on the internal shell 16 and the transverse axes 22 are fixed to the ribs 15. The glazing 10 is finally put in place in abutment on the lateral edges 28 of the internal shell 16, and the lugs 26 are folded in order to form a holding of the glazing 10.

As can be seen in FIG. 2B, particularly advantageously, the ribs 15, apart from their function of stiffening the external shell 12, are provided with cutouts forming support surfaces for the bearing structure, the internal shell 16, and the glazing 10 and forming areas for fixing the transverse axes 22.

In order to produce a solar power plant like the one shown in FIG. 4, the receiver R is suspended from the frame 3, for example by means of cables secured to the bearing structure, here the beam 6 provided with means for fixing to the frame so that the absorber is facing the mirrors 2.

Advantageously, the fixings are of the clevis type and allow a relative sliding of the beam with respect to the frame along the axis X. The absorber A is then connected to the circuit supplying "cold" heat transfer substance and to the circuit collecting "hot" heat transfer substance.

The behaviour of the receiver during the functioning of the solar power plant will now be described.

In operation, the solar radiation is reflected by the mirrors in the direction of the absorber.

The heat transfer substance circulating in the pipes is heated.

The solar flux also heats the protective structure. On the other hand, the beam 6, which is surrounded by the thermal insulation 17 and the thermal insulation disposed in the space E between the internal shell 16 and the beam 6, undergoes heating that is slow and relatively limited compared with the rest of the structure. It therefore does not deform much under the effect of the heat.

In addition, the thermal insulation limits the leakages of heat to the outside of the absorber A.

The efficacy of the heating is therefore improved.

Moreover, because of the degree of longitudinal freedom between the protective structure and the beam 6, this difference in heating and deformation by thermal expansion does not impose any stress on the receiver, the protective structure and the beam can deform separately. In addition, by virtue of the degree of longitudinal freedom between the protective structure and the absorber, differential deformation is possible.

The radiative screens 20 also limit the heating of the external shell 12 and protect the external shell 12 in the case of a defect in focusing of the reflected solar radiation, preventing differential deformations between the left and right areas of the protective structure in the representation in FIG. 1.

The external shell 12 also protects the receiver from weather, such as rain, wind, sand and sun.

Generally, a solar receiver is produced in several parts assembled on one another to produce solar power plants several hundreds of meters long. The beams are then assembled end to end.

By way of example, the external shell 12 has a length of a few meters, for example 5 m, and may also be formed from elements with a shorter length connected by putting together and fishplating, for example elements of 1 m to 2.5 m.

The modules of the internal shell have for example a length of between 1 m and 3 m.

By virtue of the invention, the bearing structure is decoupled from the other elements of the receiver subjected to solar flux, such as the absorber, and the external and internal shells in the case of an error in focusing the reflected flux. The deformations caused by the heating of the metal parts are limited and do not cause any damage to the elements of the receiver. The receiver offers an extended service life and the maintenance requirements are reduced. The functioning and operation of a solar power plant equipped with such receivers is therefore more economical.

Moreover, the manufacture of the receivers according to the present invention uses elements of current supply assembled according to simple techniques. A certain number of steps can then be automated. These advantages are particularly advantageous in the case of the manufacture of very long receivers.

The receivers may therefore be easily produced and used in countries offering high solar potential but that are not very industrialised.

The invention claimed is:

1. A solar receiver with a longitudinal axis, comprising:
an absorber;
a bearing structure extending over an entire length of the solar receiver and configured to suspend the solar receiver in a solar power plant,
a protection structure comprising an external shell and an internal shell mounted around the bearing structure forming an envelope around the bearing structure,
the protection structure configured to protect the bearing structure from heating due to solar flux,
the bearing structure and the protection structure configured to slide with respect to each other along the longitudinal axis, the absorber extending longitudinally,
the protection structure and the absorber configured to slide with respect to each other along the longitudinal direction.

2. A solar receiver according to claim 1, wherein the bearing structure comprises a beam or plural beam elements fixed to one another.

3. A solar receiver according to claim 1, wherein the thermal protection structure delimits a space for the bearing structure, thermal insulation being disposed in the space around the bearing structure.

4. A solar receiver according to claim 3, wherein a thermal insulation is disposed between the internal shell and the bearing structure.

5. A solar receiver according to claim 3, further comprising stiffening ribs fixed in the external shell, the ribs resting on the bearing structure.

6. A solar receiver according to claim 5, wherein the internal shell is secured to the ribs.

7. A solar receiver according to claim 5, wherein the bearing structure comprises a cladding offering a reduced coefficient of friction compared with the ribs.

8. A solar receiver according to claim 1, further comprising stiffening ribs fixed in the external shell, the ribs resting on the bearing structure, and wherein the internal shell delimits a housing receiving the absorber, the absorber resting on transverse axes, each transverse axis being fixed to two lateral uprights of a rib, the absorber being free to slide along the longitudinal axis with respect to the thermal protection structure.

9. A solar receiver according to claim 3, wherein the internal shell is formed by modules with a length less than that of the external shell, the modules overlapping at their longitudinal ends.

10. A solar receiver according to claim 5, wherein the thermal insulation is formed from solid blocks mounted between the ribs.

11. A solar receiver according to claim 3, further comprising radiative screens secured to the internal shell and covering lateral edges of the thermal protection structure.

12. A solar receiver according to claim 11, wherein the radiative screens are in a single piece with the internal shell.

13. A solar receiver according to claim 12, wherein the radiative screens have three surfaces for cooling by convection.

14. A solar receiver according to claim 11, wherein the radiative screens comprise a plurality of through holes.

15. A solar receiver according to claim 1, further comprising a protective glazing upstream of the absorber in a direction of reflected solar flux.

16. A solar receiver according to claim 15, wherein the protective glazing is in abutment against the internal shell and is held on the thermal protection structure by deformation of the internal shell.

17. A solar receiver according to claim 5, wherein the internal shell is secured to the ribs by deformation of the ribs.

18. A solar power plant of Fresnel type, comprising:
a solar receiver with a longitudinal axis comprising an absorber, a bearing structure extending over an entire length of the solar receiver, a protection structure comprising an external shell and an internal shell mounted around the bearing structure forming an envelope around the bearing structure, the protection structure configured to protect the bearing structure from heating due to solar flux, the bearing structure and the protection structure being configured to slide with respect to each other along the longitudinal axis, the absorber extending longitudinally and the protection structure and the absorber configured to slide with respect to each other along the longitudinal direction;
a frame from which the receiver is suspended above mirrors;
suspension means connecting the bearing structure of the frame;
a circuit supplying cold heat transfer substance to an inlet of the absorber; and
a circuit collecting hot heat transfer substance connected to an outlet of the absorber.

\* \* \* \* \*